United States Patent Office

3,752,858
Patented Aug. 14, 1973

3,752,858
PHENOL NITRATION PROCESS
Joseph D. Odenweller, Bloomfield Hills, Mich., assignor to Ethyl Corporation, Richmond, Va.
No Drawing. Filed Apr. 13, 1970, Ser. No. 28,013
Int. Cl. C07c 79/24
U.S. Cl. 260—622 R          8 Claims

ABSTRACT OF THE DISCLOSURE

A process is provided for making 2,4-di-nitro-6-sec-alkylphenols using both 2,6-di-sec-alkylphenols and o-sec-alkylphenols as starting material. In the first step, 2,6-di-sec-alkylphenols are added to excess concentrated sulfuric acid at 75–150° C. causing concurrent dealkylation and sulfonation. In the second step, o-sec-alkylphenols are added to consume most of the remaining sulfuric acid, permitting replacement of sulfonic acid groups with nitro groups by reacting the final mixture with aqueous alkali metal nitrates. The products (e.g., 2,4-di-nitro-6-sec-butyl-phenol) are useful as selective herbicides.

BACKGROUND 2,4 - di-nitro-6-sec-alkylphenols such as 2,4-di-nitro-6-sec-butylphenol are useful as selective herbicides. These compounds are known (U.S. 2,048,168) as well as their herbicide use (U.S. 2,392,859). The compounds can be made according to the procedure shown in U.S. 2,810,767. According to that process, o-alkylphenols are first disulfonated with sulfuric acid and then reacted with aqueous sodium nitrate. Unfortunately, most processes for making o-alkylphenol starting materials also yield a quantity of di-alkylphenols. An example of such a process is described in U.S. 2,831,898, in which phenol is reacted with an olefin in the presence of an aluminum phenoxide catalyst. In the past, it has not been possible to use these di-alkylphenols in the preparation of 2,4-di-nitro-6-alkyl-phenols and they have, therefore, represented an economic loss.

SUMMARY

According to the present invention, a process is provided for producing 2,4-di-nitro-6-sec-alkylphenols which utilizes both o-sec-alkylphenols and 2,6-di-sec-alkylphenols as starting materials. In this process, 2,6-di-sec-alkylphenol is first reacted with excess concentrated sulfuric acid at elevated temperature, which serves to both dealkylate and sulfonate the 2,6 - di-sec-alkylphenol. Following this, a substantial part of the remaining sulfuric acid is utilized by reaction with additional o-sec-alkylphenol, leaving a reaction mixture of sufficiently low free sulfuric acid concentration that it can be mixed with aqueous alkali metal nitrate solution to effect replacement of sulfonic acid groups with nitro radicals without substantial oxidation.

DESCRIPTION OF THE PREFERRED EMBODIMENTS

In a preferred embodiment of this invention a process is provided for preparing 2,4-di-nitro-6-sec-alkylphenols utilizing 2,6-di-sec-alkylphenols as a starting material, said process comprising:

(A) Reacting about 0.01–0.3 mole parts of a 2,6-di-sec-alkylphenol with one mole part of concentrated sulfuric acid at a temperature of from about 75–150° C., until a substantial part of said 2,6-di-sec-alkylphenol is converted to 2,4-di-sulfonated-6-sec-alkylphenol to form a first sulfonate mixture, (B) Adding about 0.1–0.49 mole parts of an o-sec-alkylphenol to said first sulfonate mixture and reacting at a temperature of from about 50–100° C., until a substantial part of said o-sec-alkylphenol is converted to 2,4-di-sulfonated-6-sec-alkylphenol to form a second sulfonate mixture, and (C) Reacting said second sulfonate mixture with an aqueous solution of an alkali metal nitrate at a temperature of from about 70–100° C.

The process can be used to dinitrate a wide range of 2,6-di-sec-alkylphenols. Typical sec-alkyl groups include isopropyl, sec-butyl, sec-amyl, sec-hexyl, sec-octyl, sec-dodecyl, sec-cetyl, sec-octadecyl, sec-eicosyl, sec-triacontyl, sec-tetracontyl, sec-pentacontyl, and the like, including many of their isomeric forms. A preferred class of 2,6-di-sec-alkylphenols is that in which the sec-alkyl groups contain from 3 to about 20 carbon atoms. Both alkyls can be the same or different. Some examples are:

2,6-di-sec-butylphenol
2-isopropyl-6-sec-butylphenol
2,6-di-sec-amylphenol
2,6-di-sec-hexylphenol
2-sec-butyl-6-sec-hexylphenol
2,6-di-sec-dodecylphenol
2,6-di-sec-eicosylphenol
2-isopropyl-6-sec-butylphenol The preferred phenols are those in which both sec-alkyls are the same. In the more preferred case both sec-alkyls are the same and contain from 3 to about 8 carbon atoms. The most preferred phenol for use in the first stage is 2,6-di-sec-butylphenol.

The first stage is generally conducted by adding the 2,6-di-sec-alkylphenol to the concentrated sulfuric acid while being stirred at reaction temperature. The sulfuric acid should be of sufficient concentration to effect both dealkylation and sulfonation of the phenol under the reaction conditions. A useful initial concentration range is from about 65–100 percent sulfuric and, also, oleums containing, for example, up to 65 percent sulfur trioxide. A preferred concentrated sulfuric acid is one containing about 90–100 percent $H_2SO_4$.

The temperatures in the first stage should be high enough to effect mono-dealkylation and disulfonation, but not so high as to otherwise cause substantial decomposition of the 2,6-di-sec-alkylphenol. A useful temperature range is from about 75–150° C. A more preferred range is from about 80–125° C., and a most preferred temperature range is from about 90–110° C.

A feature of the process is that it allows the use of an excess of sulfuric acid beyond that required to disulfonate the di-sec-alkylphenol. This permits dealkylation and di-sulfonation to a degree not readily attainable when the amount of sulfuric employed is closer to stoichiometric. The excess sulfuric acid would normally lead to excessive oxidation in the nitration stage. By the present invention, this problem is avoided by reacting a substantial portion of the excess sulfuric acid in a second stage sulfonation in which the phenol is a mono-ortho-sec-alkylphenol. Sulfonation of these phenols does not require the large excess of sulfuric acid because it is not necessary to concurrently dealkylate. Hence, by the combination of these two sulfonation stages, it is now possible to utilize a substantial portion of 2,6-di-sec-alkylphenols in the manufacture of 2,4-di-nitro-6-sec-alkylphenols. This permits utilization of an alkylation by-product that formerly could not be used.

The amount of phenolic reactant employed in the first stage is best expressed in terms of of its mole ratio to the sulfuric acid. The amount of 2,6-di-sec-alkylphenol reacted in the first stage can be any amount up to that which consumes enough $H_2SO_4$ to reduce the concentration so that the dealkylation and disulfonation no longer readily occurs under the reaction conditions. This can easily be determined by conducting a series of dealkylation and sulfonation tests gradually increasing the amount of 2,6-disec-alkylphenol relative to the $H_2SO_4$. In general, good results are obtained using up to about 0.4 mole parts of 2,6-di-sec-alkylphenol per mole of sulfuric acid. A preferred range is from about 0.01 to 0.3 mole per mole of sulfuric acid. This results in a first sulfonation mixture containing 2,4-disulfonated-6-sec-alkylphenol formed by concurrently dealkylating and sulfonating the starting 2,6-di-sec-alkylphenol. The mixture also contains the excess sulfuric acid above that consumed in sulfonating the 2,6-di-sec-alkylphenol.

The first sulfonation stage should be conducted for a period sufficient to give a high degree of mono-dealkylation and disulfonation. Good results result from reacting periods of from about 15 minutes to 8 hours. Especially good results have been obtained with reaction times of from about 15 minutes to one hour after all the reactants have been mixed.

In the second stage the residual sulfuric acid in the first sulfonation mixture is reduced to a level that does not cause a substantial amount of oxidation when the second sulfonation mixture is added to the final nitrating solution. This reduction in sulfuric acid is accomplished by adding o-sec-alkylphenol to the first sulfonation mixture. The sec-alkyl groups on this phenol can be any of those described as satisfactory on the 2,6-di-sec-alkylphenols. It is generally preferred, although not required, that the sec-alkyl group on the o-sec-alkylphenols be the same as those on the 2,6-di-sec-alkylphenol. However, if a mixed product can be used, which is often the case, the alkyl groups can be different. The preferred sec-alkyl groups are those containing from 3 to about 8 carbon atoms, and the most preferred is o-sec-butylphenol.

The amount of o-sec-butylphenol added in the second stage depends to some extent upon how much 2,6-di-sec-alkylphenol was used in the first stage. Naturally, the total amount of phenol reactant should not substantially exceed about 0.5 mole per mole of sulfuric acid, the stoichiometric amount required for disulfonation, or there will be unreacted sec-alkylphenol carried through to the products. However, this is not critical since small amounts of sec-alkylphenols do not detract from the herbicide properties of the 2,4-di-nitro-6-sec-alkylphenol. Good results are obtained when the amount of 2,6-di-sec-alkylphenol plus o-sec-alkylphenol is at least about 0.3 mole per mole of sulfuric acid. In other words, a preferred amount of total phenol reactant including both first and second stages is from about 0.3 to 0.5 mole per mole of sulfuric acid. A more preferred total amount is from about 0.35 to 0.45 mole per mole of sulfuric acid.

From this, it can be seen that the amount of o-sec-alkylphenol used to achieve the proper balance between 2,6-di-sec-alkylphenol and o-sec-alkylphenol depends upon how much 2,6-di-sec-alkylphenol was used in the first stage. However, in general, good results are achieved when from about 0.1 to 0.49 mole of o-sec-alkylphenol per mole of initial sulfuric acid is used in the second stage.

The temperature in the second stage need not be as high as in the first stage. It should be high enough to cause sulfonation of the o-sec-alkylpenol but not so high as to cause substantial decomposition. Good results are achieved at temperatures from about 50–125° C. A preferred range is from about 70–100° C., and especially good results are obtained at 70–90° C.

The reaction time for the second sulfonation stage can vary over a wide range. It should be long enough to assure a high degree of sulfonation under the reaction conditions. Good results are achieved using reaction times of from 5 minutes to 8 hours. Especially good results are obtained by maintaining the reaction mixture at reaction temperature for about 15 minutes to one hour after all reactants have been mixed.

The second sulfonation mixture is converted to 2,4-di-nitro-6-sec-alkylphenol by mixing it with an aqueous solution of an alkali metal nitrate. The concentration of the alkali metal nitrate can vary over a wide range. Good results are achieved using from about 10–70 percent. A preferred range is from 20–50 percent. At high concentrations the aqueous solution should be kept warm to prevent precipitation, although such precipitation does not prevent nitration.

Any alkali metal nitrate can be used such as sodium nitrate, potassium nitrate, lithium nitrate, rubidium nitrate or cesium nitrate. For practical reasons, sodium nitrate is preferred because of its low cost and availability.

The amount of alkali metal nitrate solution used should be sufficient to convert all the sulfonic acid groups on the phenols to nitro groups. If 0.3 total mole of phenol is in the second sulfonation mixture, then at least 0.6 mole of alkali metal nitrate should be used in the aqueous nitrating solution. Likewise, if 0.5 total mole of phenol is in the second sulfonation mixture, then at least 1.0 mole of alkali metal nitrate should be in the aqueous nitrating solution. In general, the process as described can employ from about 0.6–10 moles or more of alkali metal nitrate per mole of sulfuric acid. Since such large excess is not required, a preferred range is from about 0.6–2 moles per mole of sulfuric acid, and a most preferred amount is from about 0.9–1.5 moles of alkali metal nitrate per mole of sulfuric acid.

Nitrating temperature should be high enough to cause a rapid replacement of sulfonic acid with nitro groups. Good results are achieved at temperatures above about 50° C. For practical reasons, it is preferred to keep the temperature at or below the reflux temperature of the mixture because, although higher temperatures can be employed, they are not necessary and require special equipment such as pressure vessels. A preferred temperature range is from about 70–100° C., and an especially preferred range is from about 85–100° C.

The nitration should be continued for a period sufficient to give a high yield of product. Good results can be achieved by reacting the mixture for about 15 minutes to 4 hours after all reactants have been mixed. A preferred reaction time is from about 30 minutes to 1.5 hours.

The manner in which the process is conducted is readily understood from the following examples. All parts are by weight unless otherwise specified.

Example 1

In a reaction vessel equipped with stirrer, thermometer and heating means was placed 126 parts (1.25 moles) of 98 percent sulfuric acid. The acid was heated to 100° C. and, while stirring, 25.7 parts (0.125 mole) of 2,6-di-sec-butylphenol were added over a 45 minute period at 98–100° C. Following this, 56.2 parts (0.375 mole) of o-sec-butylphenol were added to the first sulfonation mixture at a temperature of 80–81° C. over a period of 75 minutes.

In a second reaction vessel equipped with stirrer and heating means was placed 106 parts (1.25 moles) of sodium nitrate and 160 parts of water. This mixture was stirred and heated to 95° C. and then the above sulfonation mixture was slowly added to the aqueous sodium nitrate solution at 93–95° C. over a period of 30 minutes. The resulting mixture was then stirred at about 95° C. for an additional one hour. Following this, stirring was stopped, and the mixture allowed to separate into two phases. The aqueous phase was removed, and the organic phase washed with water, giving 96.9 parts of product which analyzed by gas chromatograph as 97 percent, 2,4-di-nitro-6-sec-butylphenol.

Example 2

This example shows the results achieved when it is attempted to dealkylate and nitrate a 2,6-di-sec-alkylphenol without employing the two sulfonation stages described by this invention.

In a reaction vessel as described in Example 1 was placed 120 parts (1.20 moles) of 98 percent sulfuric acid. The acid was heated to 100° C. and then 82.4 parts (0.4 mole) of 2,6-di-sec-butylphenol were added during a 45 minute period at temperatures from 93–110° C.

In a second reaction vessel was placed 85 parts (1 mole) of sodium nitrate and 128 parts of water. This mixture was heated to 95° C. and the above sulfonate mixture added to it while stirring at 93–97° C. over a 30 minute period. Brown fumes (nitric oxide) were evolved during this addition. Following the addition, the mixture was stirred at 85–93° C. for one hour, and then the aqueous phase was removed. The product was washed with water and analyzed by gas chromatograph, which indicated that the product contained only 5 percent 2,4-di-nitro-6-sec-alkylphenol.

Example 3

This example was conducted similar to Example 1 except the first sulfonation stage was conducted at 80–82° C. Gas chromatographic analysis of the product showed it to contain 90 percent 2,4-di-nitro-6-sec-alkylphenol.

Example 4

In the reaction vessel described in Example 1 was placed 126 parts (1.25 moles) of 98 percent sulfuric acid. While stirring, this was heated to 110° C., and then 25.7 parts (0.125 mole) of 2,6-di-sec-butylphenol were added over a 6 minute period at 108–110° C. The resulting sulfonate mixture was stirred for 30 minutes at 105–110° C. and then 56.2 parts (0.375 mole) of o-sec-butylphenol were added at 80–81° C. over a 5 minute period. The resultant second sulfonate mixture was stirred for an hour at 80–81° C. In a second reaction vessel was placed 106 parts (1.25 moles) of sodium nitrate and 160 parts of water. This mixture was stirred and heated to 90° C. and the above second sulfonate mixture was then added to it at 90–95° C. over a 35 minute period. The resultant nitration mixture was stirred at 89–95° C. for one hour and then allowed to separate into two phases. The aqueous phase was removed and the organic phase was washed with water. The yield of product was 97.8 parts (81.5 percent of theory) which analyzed 98.4 percent 2,4-di-nitro-6-sec-butylphenol by gas chromatograph.

In the above example other 2,6-di-sec-alkylphenols can be employed such as those previously listed. These include such phenols as 2,6-di-isopropylphenol, 2,6-di-sec-amylphenol, 2-isopropyl-6-sec-amylphenol, 2,6-di-sec-hexylphenol, 2,6-di-sec-dodecylphenol, 2,6-di-sec-eicosylphenol and the like.

Likewise, other corresponding o-sec-alkylphenols can be employed with good results such as o-isopropylphenol, o-sec-amylphenol, o-sec-hexylphenol, o-sec-dodecylphenol and o-sec-eisosylphenol.

Example 5

In this example 0.01 mole part of 2,6-diisopropylphenol are added to one mole part of oleum (30 percent $SO_3$) and the mixture stirred at 75° C. for one hour. Then, 0.49 mole parts of o-isopropylphenol are added at 75° C. and this mixture stirred for 2 hours at 75–85° C. The resultant mixture is added to a 25 percent aqueous solution containing 2 mole parts of potassium nitrate at 75–90° C. over a one hour period. The mixture is stirred 2 hours at 80–85° C. and then the aqueous phase removed. The remaining organic phase is washed 3 times with water, leaving 2,4-di-nitro-6-isopropylphenol as the product.

Example 6

In this example 0.3 mole parts of 2,6-di-sec-amylphenol are added to one mole of 95 percent sulfuric acid at 90–95° C. over a 30 minutes period. This mixture is stirred for one hour at 90–95° C. and then one mole part of o-sec-amylphenol is added at 80–85° C. This mixture is stirred one hour at 80–82° C. and then added to a 50 percent aqueous solution containing one mole part of sodium nitrate. This mixture is stirred at 95–100° C. for one hour and then the aqueous phase removed. The organic phase is washed three times with water and then heated to 90° C. at a reduced pressure of 10 mm. Hg to remove water and other volatiles. The product is filtered, producing 2,4-di-nitro-6-sec-amylphenol.

Following the general procedure of each of the above examples, all of the previously listed 2,6-di-sec-alkylphenols and o-sec-alkylphenols can be converted to the corresponding 2,4-di-nitro-6-sec-alkylphenol in good yield.

What is claimed is:

1. A process for making 2,4-di-nitro-6-sec-alkylphenols utilizing 2,6-di-sec-$C_{3-20}$-alkylphenols as a starting material, said process comprising:
   (A) reacting about 0.01–0.3 mole parts of a 2,6-di-sec-$C_{3-20}$-alkylphenol with one mole part of concentrated sulfuric acid at a temperature of from about 75–150° C., until a substantial part of said 2,6-di-sec-$C_{3-20}$-alkylphenol is converted to 2,4-di-sulfonated-6-sec-alkylphenol to form a first sulfonate mixture,
   (B) adding about 0.1–0.49 mole parts of an o-sec-$C_{3-20}$-alkylphenol to said first sulfonate mixture and reacting at a temperature of from about 50–100° C., until a substantial part of said o-sec-$C_{3-20}$-alkylphenol is converted to 2,4-di-sulfonated-6-sec-alkylphenol to form a second sulfonate mixture, and
   (C) reacting said second sulfonate mixture with an aqueous solution of an alkali metal nitrate at a temperature of from about 70–100° C.

2. A process of claim 1 wherein said 2,6-di-sec-$C_{3-20}$-alkylphenol is 2,6-di-sec-butylphenol, said o-sec-$C_{3-20}$-alkylphenol is o-sec-butylphenol and said alkali metal nitrate is sodium nitrate.

3. A process of claim 2 wherein said temperature in Step (A) is from about 90–110° C.

4. A process of claim 3 wherein said temperature in Step (B) is from about 70–90° C.

5. A process of claim 2 wherein about 0.075 to 0.15 mole parts of said 2,6-di-sec-butylphenol are reacted in Step (A).

6. A process of claim 5 wherein about 0.25 to 0.4 mole parts of said o-sec-butylphenol are reacted in Step (B).

7. A process of claim 6 wherein said temperature in step (A) is from about 90–110° C. and said temperature in Step (B) is from about 70–90° C.

8. A process of claim 7 wherein about 0.1 mole parts of said 2,6-di-sec-butylphenol are reacted in Step (A) and about 0.3 mole parts of said o-sec-butylphenol are added in Step (B).

References Cited

UNITED STATES PATENTS

| 2,048,168 | 7/1936 | Pollard | 260—143 |
| 2,810,767 | 10/1957 | Clarke et al. | 260—622 R |

FOREIGN PATENTS

| 178,388 | 2/1966 | U.S.S.R. | 260—622 |
| 1,122,072 | 9/1956 | Germany | 260—622 |

OTHER REFERENCES

Hart: "J. Amer. Chem. Soc," vol. 73, pp. 3179–3181.

BERNARD HELFIN, Primary Examiner

W. B. LONE, Assistant Examiner

U.S. Cl. X.R.

260—512 R